April 5, 1966 HIROJI ITOH ETAL 3,244,764
PROCESS FOR PURIFYING GAS CONTAINING ACETYLENE, ETHYLENE
AND IMPURITIES OBTAINED BY THERMAL
CRACKING OF HYDROCARBON
Filed Sept. 7, 1962
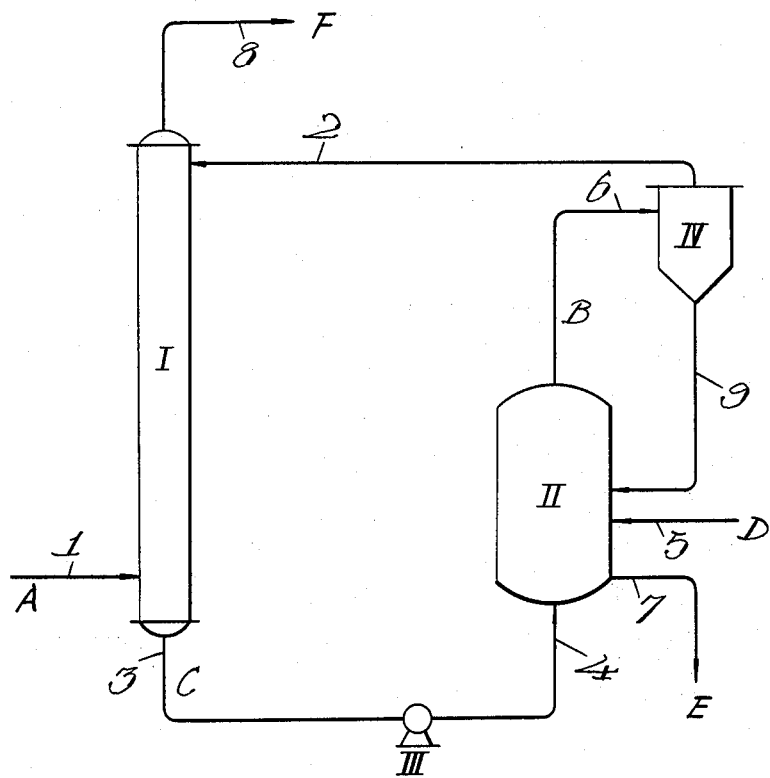
INVENTORS
HIROJI ITOH,
KOICHI WASHIMI &
BY  AKIO KOBAYASHI
Mason, Fenwick & Lawrence
Attorneys

United States Patent Office 3,244,764
Patented Apr. 5, 1966

3,244,764
PROCESS FOR PURIFYING GAS CONTAINING ACETYLENE, ETHYLENE AND IMPURITIES OBTAINED BY THERMAL CRACKING OF HYDROCARBON
Hiroji Itoh, Tokyo, and Koichi Washimi and Akio Kobayashi, Nishiki-machi, Nakoso-shi, Fukushima-ken, Japan, assignors to Kureha Kagaku Kogyo Kabushiki Kaisha, Tokyo, Japan, a corporation of Japan
Filed Sept. 7, 1962, Ser. No. 222,049
Claims priority, application Japan, Sept. 12, 1961, 36/32,287
19 Claims. (Cl. 260—679)

The present invention relates to a process for purifying gas containing acetylene, ethylene and impurities obtained by thermal cracking of hydrocarbon.

In case acetylene and ethylene are individually separated from mixed gas containing acetylene, ethylene and gaseous impurities obtainable as a result of subjecting hydrocarbon such as natural gas, petroleum naphtha and the like to thermal cracking and are then purified, or in case mixed gas as such in next reaction step, for example it is used as material for synthesizing vinyl chloride, it is necessary and important to remove from the mixed gas impurities contained therein, particularly higher acetylene, for example methylacetylene, diacetylene, monovinylacetylene and the like and higher unsaturated hydrocarbon containing more than 3 carbon atoms, for example propylene, allene, butene, butadiene and the like which are poison for catalyst in next reaction step.

Heretofore has been known a process wherein in order to remove these higher acetylenes and higher unsaturated hydrocarbons containing more than 3 carbon atoms, a solvent such as kerosene, petroleum naphtha or methylpyrrolidone is used to absorb under pressure higher acetylenes and higher unsaturated hydrocarbons containing more than 3 carbon atoms, together with parts of acetylene and ethylene, then acetylenes and higher unsaturated hydrocarbons containing more than 3 carbon atoms are selectively released from solvent and thereafter the solvent recyclicly used.

However, the above prior process has the disadvantages that a large amount of energy is necessary for the heating and cooling and that acetylene and ethylene are more or less lost.

Further, another process wherein gas is directly contacted with sulfuric acid to react the higher acetylenes and higher unsaturated hydrocarbon containing 3 or more of carbon atoms in the gas with sulfuric acid and to remove them has been also known. In this process, however, a flooding tends to occur in the passing of the gas through sulfuric acid because the viscosity of sulfuric acid is gradually increased during the reaction and as a result a washing tower is clogged and a safe operation can not be carried out.

For example, the viscosity of sulfuric acid when it is used until the concentration of it is increased to 60% (organic matter: about 30%, water: about 10%) is more than 200 centipoises. Notwithstanding that the washing ability is still sufficient, it is necessary that sulfuric acid should be exchanged when the concentration of it is reached to about 75%.

According to the present invention a process for purifying gas containing acetylene, ethylene and impurities obtained by thermal cracking of hydrocarbon comprises treating the gas with organic solvent which neither dissolves sulfuric acid nor reacts therewith and is separatable therefrom by specific gravity difference to make absorb higher acetylenes and higher unsaturated hydrocarbons containing more than 3 carbon atoms which are contained in the gas as impurities, then by withdrawing the organic solvent and by contacting it with sulfuric acid to react only the higher acetylenes and higher unsaturated hydrocarbons containing more than 3 carbon atoms in the organic solvent with sulfuric acid and to dissolve them thereto, then by separating said organic solvent from said sulfuric acid and by recycling and utilizing the separated organic solvent for treatment of the gas.

In the present invention, it is possible to almost completely prevent loss of acetylene and ethylene without the use of extra heat and pressure, to selectively remove only higher acetylene and higher unsaturated hydrocarbons containing more than 3 carbon atoms, to prevent the occurrence of difficulties such as blockage of treating tower in case its continuous run is carried out for a long time. For example, the process of the present invention can be carried out even if the viscosity of sulfuric acid is increased and its concentration becomes less than 50%. Therefore, it may be said that the present invention is an extremely and industrially advantageous process.

The drawing shows a flow sheet in the case of carrying out the present invention.

The present invention is explained detailedly, referring to the drawing, as follows:

Hydrocarbon such as natural gas, petroleum naphtha or the like is subjected to thermal cracking, then carbon and tar are removed from the obtained gas by washing it with heavy oil and the like, the cracked hydrocarbon is subjected to pressure under 10 kg./cm.$^2$ if necessary, then carbon dioxide gas contained in the cracked hydrocarbon is not or is removed by using monoethanolamine or aqueous ammonia, and then the cracked hydrocarbon containing acetylene, ethylene and impurities, which can be obtained through dehydration by freeze-drying or by making said cracked hydrocarbon contact with cold methanol as occasion demands is introduced into absorption tower I from pipe 1 and is made to contact in counter-current with solvent (for example decahydronaphthalene, octane, ethane dichloride and the like) which flows down from pipe 2. The gas from which said impurities are absorbed flows out from the top of tower I through pipe 8 to the next process.

Thus higher acetylenes and higher unsaturated hydrocarbons containing more than 3 carbon atoms, which are contained in the cracked hydrocarbon together with an extremely small quantity of acetylene and part of the ethylene are absorbed by the solvent and removed. At this time absorption is generally carried out satisfactorily at normal temperature and under normal pressure, but the absorption may be carried out in a temperature of about —30° C. or under a pressure of about 10 kg./cm.$^2$ or under a reduced pressure, if necessary. The organic solvent containing higher acetylenes and higher unsaturated hydrocarbons containing more than 3 carbon atoms is drawn out from the absorption tower I at pipe 3 and is sent to washing tower II at pipe 4 via pump III and is made to contact in counter-current with sulfuric acid of about 80–95% which flows down from the top of the tower at pipe 5. As this time washing tower II may be subjected to heating and pressure as occasion demands. Higher acetylene and higher unsaturated hydrocarbon containing more than 3 carbon atoms, which are contained in the organic solvent react chemically with existing sulfuric acid or polymerize or dissolve in sulfuric acid to transfer into sulfuric acid phase.

Organic solvent from which higher acetylenes and higher unsaturated hydrocarbons containing more than 3 carbon atoms have already been removed and which is discharged from the upper part of washing tower II via pipe 6, is separated in separation tower IV from sulfuric acid by which the solvent has been accompanied, and is made to recycle to the top part of adsorption tower I via pipe 2 and is re-used. Separated sulfuric acid is returned to washing tower II via pipe 9. Sulfuric acid whose concentration has declined to below 40% as a result of having been dilute in washing tower II through reaction and dissolution is discharged from washing tower through pipe 7. But according to the kind of solvent used, sulfuric acid of higher concentration can be discharged because of separation due to specific gravity difference. By the operation cracked gas from which higher acetylenes and higher unsaturated hydrocarbons containing more than 3 carbon atoms have been removed, is discharged from the top of absorption tower I through pipe 8, and this can be used immediately as raw material in the next reaction step, for example synthesis of vinyl chloride.

If the concentration of sulfuric acid used at the time of carrying out the present invention is below 95%, acetylene and ethylene scarcely react with sulfuric acid and dissolve thereto. Therefore, solvent from which only higher acetylenes and higher unsaturated hydrocarbons containing more than 3 carbon atoms have been removed, is separated from sulfuric acid phase due to specific gravity difference, and is made to recycle as it is saturated with acetylene and ethylene and is used. The chemical and physical properties of the solvent do not change by this treatment. Nor does it create substances which are to be separated. Therefore in absorption tower I where the solvent contacts with thermally cracked gas, troubles such as blockage never take place.

It is desirable to make solvent exist in sulfuric acid phase in the state of being finely dispersed where the former contacts with the latter. To this end, it is possible to make solvent disperse in sulfuric acid phase if a perforated plate, for example, is used. As a result of doing so, its viscosity is maintained low apparently and troubles such as blockage and difficulties in flowing do not take place.

Since the concentration of sulfuric acid declines as it is used, it is desirable to continuously supply fresh sulfuric acid of a necessary quantity or exchange sulfuric acid batchwise.

The present invention includes an idea that impurities of a small quantity contained in thermally cracked hydrocarbon gas, such as higher acetylenes and higher unsaturated hydrocarbon containing more than 3 carbon atoms are not only physically but also chemically removed. Therefore, it is possible to make easier the industrial use of the present invention by increasing impurities rate of reaction with sulfuric acid as a result of adding to sulfuric acid proper quantities of dehydrating agent (sodium sulfate or phosphorus pentoxide), reaction accelerator (aluminium sulfate or potassium bichromate), specific gravity increasing agent (potassium sulfate, or sodium sulfate) or by increasing the effect of decreasing the consumption of sulfuric acid.

If the concentration of sulfuric acid is below 40%, the rate of reaction with higher acetylenes markedly declines, resulting in an uneconomical process.

Solvents which may be used in the present process are one or more of those which are capable of separating from 40–95% sulfuric acid due to specific gravity difference and which can dissolve higher acetylenes and higher unsaturated hydrocarbons containing more than 3 carbon atoms without either reacting with said sulfuric acid or dissolving thereinto, for example, paraffinic and naphthenic hydrocarbons such as hexane, heptane, octane, nonane, decane, cyclohexane, decahydronaphthalene, petroleum naphtha from which unsaturated fractions have been removed by sulfuric acid treatment kerosene and the like; nitrohydrocarbons such as nitromethane, nitroethane, nitropropane and the like; chlorinated hydrocarbons and particularly, the liquid saturated chloroalphiphatic hydrocarbons such as dichloroethane, ethane, trichloride, carbon tetrachloride and the like; higher alkyl ethers containing alkyl group containing more than 6 carbon atoms such as dihexyl ether, dioctyle ether and the like; and carbon bisulfide. Even if the dissolubility of said solvents to acetylene and ethylene is high, it will do because of the aforesaid principle. Therefore, if solvents, for example, kerosene, petroleum naphtha and the like; which could be used in the past for the purpose of selectively adsorbing higher acetylenes and higher unsaturated hydrocarbons, only under specific conditions, for example, under extreme cooling or under extreme pressure, are used in the present process, they will fulfil their function of adsorption at normal temperature and under normal pressure. This is an advantage of the present invention.

Those substances such as decahydronaphthalene, nitroethane and the like which could not be used in the past as agents for absorbing higher acetylenes and higher unsaturated hydrocarbons for the purpose of dissolving large quantities of acetylene, ethylene and the like, have become not only usable but extremely satisfactorily for the first time in the present process.

The present invention is illustrated in the following examples.

*Example 1*

Mixed gas which is obtained by thermal cracking petroleum naphtha and thereafter washing with heavy oil, water and the like to remove carbon, tar and the like and which contained 8 mol percent of acetylene, 8 mol percent of ethylene, 0.3 mol percent of propylene, 0.3 mol percent of methyl acetylene, 0.2 mol percent of allene, 0.2 mol percent of iso and n-butene, 0.4 mol percent of butadiene, 0.2 mol percent of monovinylacetylene, 10 mol percent of methane, 20 mol percent of carbon monoxide, 14 mol percent of carbonic acid gas, 35 mol percent of hydrogen gas and 3 mol percent of steam, was introduced into absorption tower at a velocity of 200 l./hr. under normal pressure and at the rate of 40 m.$^3$/hr., and propylene, methyl acetylene, allene, butene, butadiene and monovinylacetylene which are higher acetylenes and higher unsaturated hydrocarbons containing more than 3 carbon atoms, were removed from the mixed gas by using decahydronaphthalene (trans- and cis-mixture) which was introduced from the top of the tower as solvent and absorbing said propylene, etc. at normal temperature. Decahydronaphthalene which was an organic solvent which had absorbed higher acetylenes and higher unsaturated hydrocarbons containing more than 3 carbon atoms, was sent to a lower part of washing tower and was made to bubble at normal temperature through a porous plate in 90% sulfuric acid which was introduced into said washing tower through its top part continuously at the rate of 0.5 l./hr., then higher acetylenes and higher unsaturated hydrocarbons separated into 2 phases were made to transfer into sulfuric acid phase, then sulfuric acid accompanying the solvent was separated in separation tower, and then organic solvent of the upper phase was made to recycle to the absorption tower and sulfuric acid diluted by reaction and dissolution was continuously taken out of washing tower.

Thus absorption was carried out continuously, and as a result, the loss of acetylene and ethylene was below 0.1%, and the concentration of each of said higher acetylenes and higher unsaturated hydrocarbons containing more than 3 carbon atoms in the gas at the outlet of the absorption tower decreased to under 0.001%.

In absorption tower and washing tower operation was carried out continuously for 1,000 hours, and as a result, blockage due to separation did not take place. But when the same sulfuric acid, used direct to contact with the gas as was described at normal temperature and under normal pressure and was made to absorb higher acetylenes and higher unsaturated hydrocarbons, blockage of the absorption tower took place in about 50 hours.

Example 2

Such gas as was described in Example 1, from which carbon and tar had been removed, was introduced into absorption tower in the same manner as in Example 1 under pressure of 5 kg./cm.$^2$ (in this case containing 0.5 mol percent moisture) and absorption was carried out at normal temperature, using ethylene dichloride as solvent, then the ethylene dichloride of 150 l./hr. was introduced into washing tower then 80% sulfuric acid was made to contact with organic solvent in counter-current, then in separation tower sulfuric acid was separated from solvent by specfic gravity difference, and then the solvent was made to recycle to absorption tower. As a result of continuously carrying out absorption thus, the loss of each of acetylene and ethylene was below 0.05%, and the concentration of each of the aforesaid impurities at the outlet of the absorption tower was below 0.02%.

Example 3

Such raw material gas as was described in Example 1, from which carbon and tar had been removed, was introduced into absorption tower after it was compressed to 5 kg./cm.$^2$, carbon dioxide gas was removed by treatment in counterflow with triethanolamine and further after it was dehydrated by cooling to −10° C., and thereafter the same step as Example 1 was taken. But in this case 90% sulfuric acid was introduced into the upper part of the washing tower at the rate of 0.2 l./hr. As a result, the same satisfactory results as Example 1 were obtained.

We claim:

1. A process for purifying a gas containing acetylene and ethylene from impurities produced therein by thermal cracking of hydrocarbons comprising: treating the gas with an organic solvent which is insoluble and unreactive with respect to sulfuric acid in the presence of said acid, and is separable therefrom by gravity, absorbing from the gas higher acetylenes and higher unsaturated hydrocarbons containing more than 3 carbon atoms which are contained in the gas as impurities, collecting the remaining gas, withdrawing said solvent with said acetylenes and hydrocarbons, contacting said solvent containing said acetylenes and hydrocarbons with sulfuric acid to dissolve said acetylenes and hydrocarbons only, and separating said solvent from said acid.

2. A process as claimed in claim 6 wherein the organic solvent is also added with dehydrating agent, reaction accelerator and specific gravity increasing agent.

3. A process as claimed in claim 6 wherein the sulfuric acid is 40–95% (specific gravity 1.31–1.84) sulfuric acid.

4. A process as claimed in claim 6 wherein the organic solvent is selected from the group consisting of saturated chloroaliphatic liquid hydrocarbons.

5. A process as claimed in claim 4 wherein the chlorinated hydrocarbon is dichloroethane.

6. The process of claim 1 wherein the solvent is selected from the group consisting of paraffinic hydrocarbons, naphthenic hydrocarbons, petroleum naphtha having unsaturated fractions removed, nitrohydrocarbons, chlorinated hydrocarbons, higher alkyl ethers having an alkyl group containing more than 6 carbon atoms and carbon bisulfide.

7. The process of claim 1 wherein a dehydrating agent selected from the group consisting of sodium sulfate and phosphorus, a reaction accelerator selected from the group consisting of aluminum sulfate and potassium bichromate, and a specific gravity increasing agent selected from the group consisting of potassium sulfate and sodium sulfate are added to the sulfuric acid.

8. A process for purifying a gas containing acetylene and ethylene from impurities produced therein by thermal cracking of hydrocarbons comprising: treating the gas with an organic solvent insoluble and inert to sulfuric acid to absorb higher acetylenes and higher unsaturated hydrocarbons containing more than 3 carbon atoms which are contained in the gas as impurities, collecting said gas substantially free of said acetylenes and hydrocarbons, contacting said solvent containing said acetylenes and hydrocarbons with sulfuric acid, reacting said acid with said acetylenes and hydrocarbons only, settling by gravity the sulfuric acid and the organic solvent into two substantially separate and distinct phases, a first phase containing primarily the organic solvent and the second phase containing primarily sulfuric acid and said acetylenes and hydrocarbons and their reaction products and collecting said solvent.

9. The process of claim 8 wherein the solvent is selected from the group consisting of paraffinic hydrocarbons, naphthenic hydrocarbons, petroleum naphtha having unsaturated fractions removed, nitrohydrocarbons, chlorinated hydrocarbons, higher alkyl ethers having an alkyl group containing more than 6 carbon atoms and carbon bisulfide.

10. The process of claim 8 wherein a dehydrating agent selected from the group consisting of sodium sulfate and phosphorus, a reaction accelerator selected from the group consisting of aluminum sulfate and potassium bicromate, and a specific gravity increasing agent selected from the group consisting of potassium sulfate and sodium sulfate are added to the sulfuric acid.

11. The process of claim 8 wherein the organic solvent is also added with dehydrating agent, reaction accelerator and specific increasing agent.

12. The process of claim 8 wherein the sulfuric acid is 40–95% (specific gravity 1.31–1.84) sulfuric acid.

13. The process of claim 8 wherein the organic solvent is a chlorinated hydrocarbon.

14. The process of claim 8 wherein the chlorinated hydrocarbon is dichloroethane.

15. The process of claim 1 wherein the organic solvent is initially finely dispersed in the sulfuric acid.

16. The process of claim 15 wherein fine dispersion of the solvent in the sulfuric acid is achieved by passing the solvent through a porous plate into the sulfuric acid.

17. A process for purifying a gas containing acetylene and ethylene from impurities produced therein by thermal cracking of hydrocarbons comprising: treating the gas with an organic solvent to absorb higher acetylenes and higher unsaturated hydrocarbons containing more than 3 carbon atoms which are contained in the gas as impurities, said solvent being selected from the group consisting of paraffinic hydrocarbons, naphthenic hydrocarbons, petroleum naphtha having unsaturated fractions removed, nitrohydrocarbons, chlorinated hydrocarbons, higher alkyl ethers having an alkyl group containing more than 6 carbon atoms and carbon bisulfide, collecting said gas substantially free of said acetylenes and hydrocarbons, contacting said solvent containing said acetylenes and hydrocarbons with sulfuric acid, reacting said acid with said acetylenes and hydrocarbons only, settling by gravity the sulfuric acid and the organic solvent into two substantially separate and distinct phases, a first phase containing primarily the organic solvent and the second phase containing primarily sulfuric acid and said acetylenes and hydrocarbons and their reaction products and collecting said solvent.

18. A process for purifying a gas containing acetylene and ethylene from impurities produced therein by thermal cracking of hydrocarbons comprising: treating the gas with dichloroethane to absorb higher acetylenes and higher unsaturated hydrocarbons containing more than 3 carbon atoms which are contained in the gas as impurities, collecting said gas substantially free of said acetylenes and hydrocarbons, contacting said solvent containing said acetylenes and hydrocarbons with sulfuric acid, reacting said acid with said acetylenes and hydrocarbons only, settling by gravity the sulfuric acid and the organic solvent into two substantially separate and distinct phases, a first phase containing primarily the organic solvent and the second phase containing primarily sulfuric acid and said acetylenes and hydrocarbons and their reaction products and collecting said solvent.

19. The process of claim 17 wherein the sulfuric acid is 40–95% (specific gravity 1.31–1.4) sulfuric acid.

References Cited by the Examiner
UNITED STATES PATENTS

| | | | |
|---|---|---|---|
| 1,465,600 | 8/1923 | Eldred | 260—679 |
| 1,973,840 | 9/1934 | Zobel et al. | 260—679 |
| 1,988,032 | 1/1935 | Baumann et al. | 260—679 |
| 2,236,978 | 4/1941 | Taylor | 260—679 |
| 2,395,362 | 2/1946 | Welling | 55—37 |
| 3,016,985 | 1/1962 | Akin | 55—37 |

FOREIGN PATENTS 857,932  1/1961  Great Britain.

ALPHONSO D. SULLIVAN, *Primary Examiner.*